United States Patent
Boffa et al.

(10) Patent No.: US 10,369,758 B2
(45) Date of Patent: Aug. 6, 2019

(54) METHOD FOR CONTROLLING THE QUALITY OF A TYRE PRODUCTION AND PLANT FOR PRODUCING TYRES

(71) Applicant: PIRELLI TYRE S.P.A., Milan (IT)

(72) Inventors: Vincenzo Boffa, Milan (IT); Gianni Mancini, Milan (IT); Riccardo Antoj, Milan (IT)

(73) Assignee: PIRELLI TYRE S.p.A., Milan (IT)

( * ) Notice: Subject to any disclaimer, the term of this patent is extended or adjusted under 35 U.S.C. 154(b) by 115 days.

(21) Appl. No.: 15/317,442

(22) PCT Filed: Apr. 29, 2015

(86) PCT No.: PCT/IB2015/053111
§ 371 (c)(1),
(2) Date: Dec. 9, 2016

(87) PCT Pub. No.: WO2015/193746
PCT Pub. Date: Dec. 23, 2015

(65) Prior Publication Data
US 2017/0120549 A1    May 4, 2017

(30) Foreign Application Priority Data
Jun. 18, 2014 (IT) ................ MI2014A1101

(51) Int. Cl.
*B29D 30/00* (2006.01)
*B29D 30/06* (2006.01)
*G05B 19/4063* (2006.01)

(52) U.S. Cl.
CPC ..... *B29D 30/0061* (2013.01); *G05B 19/4063* (2013.01); *B29D 2030/0066* (2013.01);
(Continued)

(58) Field of Classification Search
CPC ........ B29D 30/0061; B29D 2030/0066; B29D 2030/0635; G05B 19/4063; G05B 2219/32179
(Continued)

(56) References Cited

U.S. PATENT DOCUMENTS

| | | | |
|---|---|---|---|
| 6,535,616 B1 * | 3/2003 | Hayashi | ............. G06T 1/005 375/E7.075 |
| 2003/0149542 A1 | 8/2003 | Chang | |

(Continued)

FOREIGN PATENT DOCUMENTS

| | | |
|---|---|---|
| WO | WO 2012/002949 | 1/2012 |
| WO | WO 2013/039505 | 3/2013 |

OTHER PUBLICATIONS

International Search Report from the European Patent Office for International Application No. PCT/IB2015/053111, dated Aug. 4, 2015.

(Continued)

*Primary Examiner* — Ziaul Karim
(74) *Attorney, Agent, or Firm* — Finnegan, Henderson, Farabow, Garrett & Dunner, L.L.P.

(57) ABSTRACT

A system for controlling a parameter relative to the quality of a tire being processed includes at least one system for detecting a parameter relative to one or more tires being processed. A control unit is programmed for comparing a succession of values of the parameter by comparing each value with at least one discard threshold and preferably with at least one warning threshold. The discard threshold divides a discard interval from an acceptable interval. The warning threshold belongs to the acceptable interval and defines one or more warning intervals. The control unit is also programmed for controlling the trend of the succession of (Continued)

values with respect to the discard threshold. A method for controlling quality of production of tires.

35 Claims, 7 Drawing Sheets

(52) U.S. Cl.
 CPC ............... *B29D 2030/0635* (2013.01); *G05B 2219/32179* (2013.01)

(58) Field of Classification Search
 USPC ........................................................ 700/109
 See application file for complete search history.

(56) References Cited

U.S. PATENT DOCUMENTS

| | | | |
|---|---|---|---|
| 2004/0022411 A1* | 2/2004 | Tamaru | G06T 1/005 382/100 |
| 2012/0035757 A1 | 2/2012 | Mayby et al. | |
| 2013/0098148 A1 | 4/2013 | Mawby et al. | |
| 2014/0338437 A1 | 11/2014 | Mawby et al. | |

OTHER PUBLICATIONS

Written Opinion of the International Searching Authority from the European Patent Office for International No. PCT/IB2015/053111, dated Aug. 4, 2015.

Office Action dated May 2, 2018, by the Divisional Office of Patents Mexican Patent Office in corresponding Mexican Application No. MX/a/2016/015732.

* cited by examiner

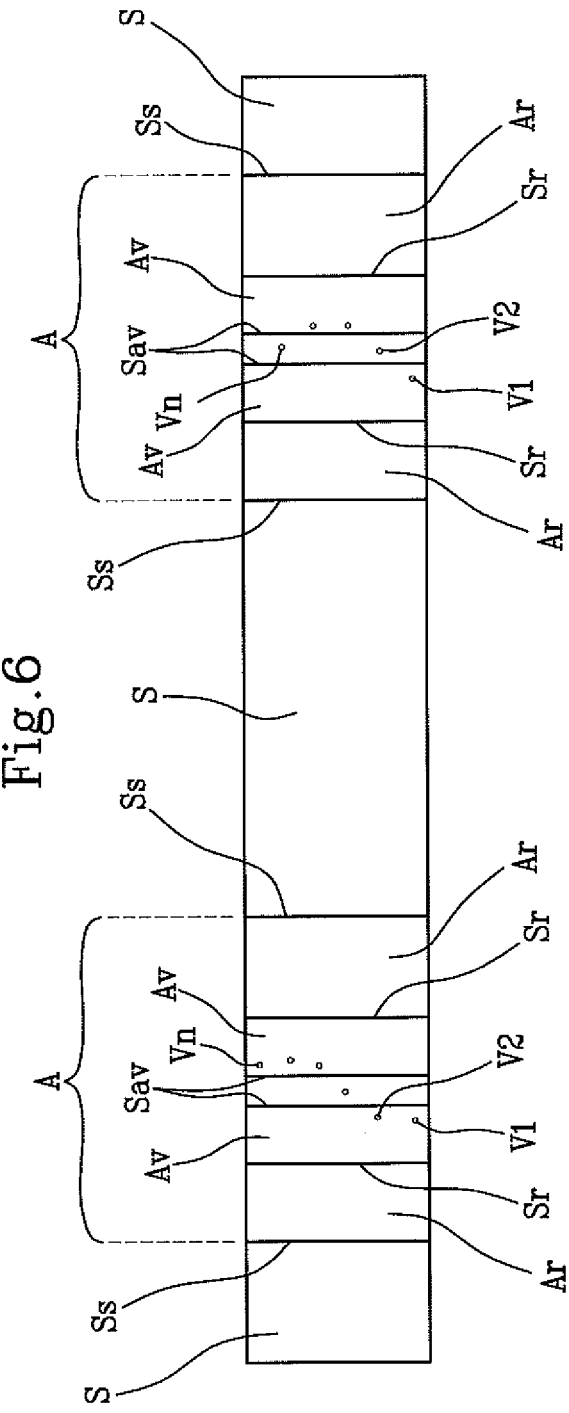
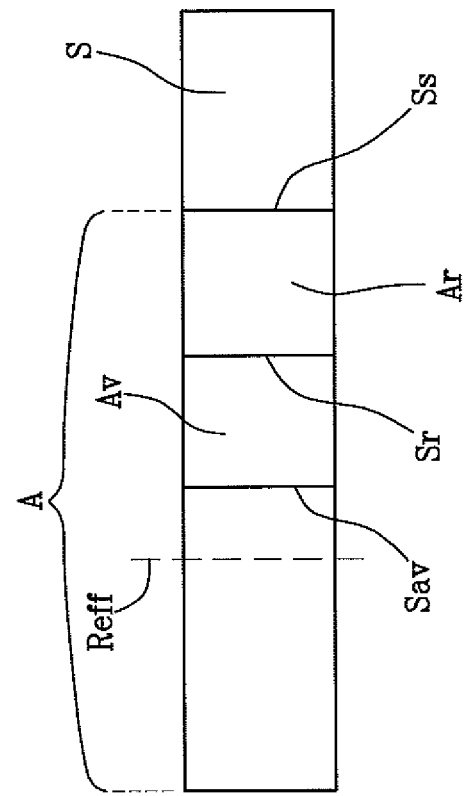

METHOD FOR CONTROLLING THE QUALITY OF A TYRE PRODUCTION AND PLANT FOR PRODUCING TYRES

CROSS REFERENCE TO RELATED APPLICATIONS

This application is a national phase application based on PCT/IB2015/053111, filed Apr. 29, 2015, which claims the priority of Italian Patent Application No. MI2014A001101, filed Jun. 18, 2014, the content of each application being incorporated herein by reference.

BACKGROUND OF THE INVENTION

Field of the Invention

The present invention relates to a method for controlling the quality of a production of tyres. The present invention also relates to a plant for producing tyres.

Description of the Related Art

Tyre production cycles provide for obtaining and/or assembling the various components of a tyre being processed in one or more building lines and then subjecting the tyre being processed to a moulding and vulcanisation process adapted to define the structure of the tyre according to a desired geometry and tread pattern.

In order to obtain the components of the tyre, starting components are provided, from which semifinished products are obtained.

Then, a green tyre is built starting from one or more semifinished products, and the green tyre is moulded and vulcanised.

The moulded and vulcanised tyre is subjected to a manual visual control after which it can be discarded or catalogued as acceptable and hence intended for the market (for the first set-up or for "replacement" parts).

Possible modifications to the production process for correcting flaws are entrusted to the experience of the operator who controls the discard, based on the type and size of the tyre.

With the term "starting components" it is intended one or more from among elastomeric materials and cords comprising at least one textile and/or metal thread employed for building a tyre. The set of multiple threads preferably has the threads twisted together.

With the term "elastomeric material" it is intended to indicate a composition comprising at least one elastomeric polymer and at least one reinforcement filler. Preferably, such composition also comprises additives such as a cross-linking agent and/or a plasticisation agent. Due to the presence of the cross-linking agent, such material can be cross-linked by means of heating, so as to form the final manufactured product.

With the term "green tyre" a tyre is indicated that is obtained at the end of the building process and not yet moulded and vulcanised.

With the term "tyre being processed" it is intended the set of one or more parts of the green tyre built on a forming support, comprising the starting components, the green tyre and the moulded and vulcanised tyre to be subjected to control.

With the term "semifinished product" it is intended a semifinished product of piece or cut-to-size conventional type such as a liner, under-liner, anti-abrasive elongated element, complex (the set including liner, under-liner and anti-abrasive elongated element), bead core, bead core filler, reinforcement insert, sidewall insert, sidewall, carcass ply, belt layer, under-layer, tread band, etc., or to an "elementary" semifinished product, i.e. in the form of at least one of the following: a continuous elongated element made of elastomeric material; a textile and/or metal reinforcement cord preferably covered with elastomeric material; a band-like element made of elastomeric material comprising at least two textile and/or metal cords. When cut to size, the latter is also termed "strip-like element".

With the term "parameter", it is intended a characteristic which can affect the quality of the tyre. The parameter is associated with one or more from among: starting components, steps for obtaining the semifinished products, semifinished products, steps for building the green tyre, green tyre, vulcanisation, moulded and vulcanised tyre. By way of example, in the case of elastomeric materials, a parameter is constituted for example by the relative expiry date. In the case of semifinished products and/or of the green tyre and/or of the moulded and vulcanised tyre, a parameter is constituted for example by the concentration and/or size of air bubbles. In the case of moulded and vulcanised tyres, a parameter is constituted for example by the presence and size of moulded cracks on the inner surface of the tyre or by the possible lack of material on the tread.

By "acceptable interval" relative to the value of a parameter, it is intended an interval of values that are acceptable or acceptable with reserve. The latter determine further controls relative to the element or step to which the parameter refers (for example, for the moulded and vulcanised tyre the presence or size of said cracks) in order to subsequently determine acceptance, auxiliary processing in order to attain acceptance or discard. By "discard interval" relative to the value of a parameter, it is intended an interval of values such to cause the discard of the element, of the step or of the element relative to a certain step to which the parameter refers. Preferably a discard threshold divides the acceptable interval from the discard interval.

With the term "detection system", it is intended a preferably automatic inspection system adapted for detecting a specific parameter. With the term "automatic visual control", it is intended a particular detection system defining a system for the automatic inspection of the moulded and vulcanised tyre.

With the term "actual resolution" of the detection system or of the automatic visual control, it is intended the resolution directly ascribable to the instrumentation that has improved due to the data processing capacity. With the term "control unit", it is intended the logical set of one or more of the control units provided for in the plant.

With the term "succession of values", it is intended a set of at least two values of a specific parameter. A particular example of succession is a time succession and/or a succession of values corresponding to one or more from among different: starting components, steps for obtaining the semifinished products, semifinished products, steps for building the green tyre, green tyre, vulcanisation, moulded and vulcanised tyre.

With the expression "controlling the trend" of the succession of values, it is intended controlling if the succession of values (or a function representative of the succession of the values) approaches or moves away from a threshold value (e.g. a discard threshold). More preferably "controlling the trend" can signify calculating the difference between each of the values of the succession and said threshold value (e.g. the value of a discard threshold) and controlling the progression thereof along said succession, indicating if it increases, decreases or remains constant in absolute terms. Possibly, "controlling the trend" can signify calculating the first derivative of the function representative of the succession of the values of the parameter and evaluating the sign thereof as a function of the value of said threshold (e.g. discard threshold) and of the values of the parameter, or evaluating the slope of the line joining two values of the parameter always as a function of the value of said threshold (e.g. discard threshold) and of the values of the parameter.

SUMMARY OF THE INVENTION

The Applicant has observed that the controls executed up to now have caused a high number of discards, in particular at the end of the production process, i.e. after all the steps to which the tyre is subjected, and hence a high final cost of the discard.

The Applicant has also verified that improving the quality of the tyre by introducing more accurate controls increases the tyre production times and the possible discards.

The Applicant has perceived that in order to improve the quality of the tyre, a more accurate control is not necessary, but it is necessary to limit the number of discards by providing for and anticipating the onset of flaws.

The Applicant has finally found that the detection of a parameter relative to the quality of a tyre being processed, the analysis of the progression of such parameter, and a possible feedback action capable of reversing the trend of such parameter, allow providing for and anticipating the onset of flaws.

More precisely, in accordance with a first aspect, the invention relates to a method for controlling the quality of a production of tyres.

Preferably a parameter is detected relative to one or more tyres being processed by means of at least one system for detecting said parameter.

Preferably a succession of values of said parameter is compared by comparing each value with at least one discard threshold wherein said at least one discard threshold divides a discard interval from an acceptable interval.

Preferably the trend of said succession of values is controlled with respect to the discard threshold.

Preferably a result of the trend control is feedbacked at least when said succession of values tends towards the discard threshold, in order to operate on at least one system for managing a tyre production plant, in a manner so as to reverse the trend of the succession of values in the course of one or more further controls.

The Applicant deems that the aforesaid solution allows improving the quality of the finished product and decrease the discards for any type of tyre production plant, independent of the semifinished products employed and produced, of the flexibility of the plants themselves and of the requested productivity levels.

In accordance with a second aspect, the invention relates to a plant for producing tyres comprising a system for managing starting components, a system for managing the obtainment of semifinished products starting from one or more starting components, a system for managing the building of a green tyre starting from one or more semifinished products, a system for managing the vulcanisation of said green tyre.

Preferably a system is provided for controlling a parameter relative to the quality of a tyre being processed comprising at least one system for detecting a parameter relative to one or more tyres being processed.

Preferably the system for controlling a parameter relative to the quality of a tyre being processed comprises at least one control unit.

Preferably said control unit is programmed for comparing a succession of values of said parameter by comparing each value with at least one discard threshold, in which said at least one discard threshold divides a discard interval from an acceptable interval.

Preferably said control unit is programmed for controlling the trend of said succession of values with respect to the discard threshold.

Preferably said control unit is programmed for feedbacking a result of the trend control at least when said succession of values tends towards the discard threshold in order to operate on at least one of said management systems in a manner so as to reverse the trend of the succession of values in the course of one or more further controls.

The present invention in at least one of the aforesaid aspects can have at least one of the following preferred characteristics.

Preferably controlling the trend of said succession of values comprises calculating the difference between each of the values and the discard threshold and comparing an absolute value of a first difference relative to a first value with an absolute value of a second difference relative to a second value which precedes said first value in said succession.

Preferably controlling the trend of said succession of values comprises calculating the first derivative of the function representative of the values of the parameter P.

Preferably comparing said succession of values of said parameter comprises comparing each value with at least one warning threshold, said at least one warning threshold belonging to the acceptable interval and defining one or more warning intervals.

Preferably said method comprises controlling the trend of said succession of values at least when a value of said succession of values is within the warning interval.

Preferably said system for detecting said parameter has its actual resolution less than said discard threshold and less than or equal to said warning threshold.

Preferably feedbacking the result of the trend control, when said absolute value of said first difference is less than said absolute value of said second difference, modifies said parameter in a manner such that said absolute value of said first difference is greater than or equal to said absolute value of said second difference in the course of one or more further controls.

Preferably said parameter is associated with one or more from among: starting components, steps for obtaining semifinished products, semifinished products, steps for building a green tyre, green tyres, vulcanisation, moulded and vulcanised tyres.

Preferably feedbacking the result of the trend control comprises sending a feedback signal to one or more from among:

a system for managing starting components;

a system for managing the obtainment of semifinished products starting from one or more starting components;

a system for managing the building of a green tyre starting from one or more semifinished products; and a system for managing the vulcanisation of the green tyre, of said plant for producing tyres.

Preferably said feedback signal is adapted to affect the respective management system for modifying said parameter in a manner so as to reverse the trend of the succession of values in the course of one or more further controls.

Preferably said feedback signal is adapted to affect the respective management system for modifying said parameter in a manner such that said absolute value of said first difference is greater than or equal to said absolute value of said second difference in the course of one or more further controls.

Preferably said succession of values comprises at least one first value and at least one second value associated with the same starting component, step for building semifinished products, semifinished product, step for building a green tyre, green tyre, vulcanisation, moulded and vulcanised tyre.

Preferably said succession of values comprises at least one first value and at least one second value respectively associated with different starting components, steps for obtaining semifinished products, semifinished products, steps for building a green tyre, green tyres, vulcanisations, moulded and vulcanised tyres.

Preferably said first value and said second value are detected at two different moments.

Preferably said system for detecting said parameter comprises a detection system associated with one of the systems for managing the relative: starting component, step for building semifinished products, semifinished product, step for building a green tyre, green tyre, vulcanisation, moulded and vulcanised tyre. Preferably detecting said parameter is carried out at said management system.

Preferably comparing said succession of values and controlling the trend of said succession of values is carried out by a control unit.

Preferably said control unit comprises a control unit of said system for managing the relative: starting component, step for building semifinished products, semifinished product, step for building a green tyre, green tyre, vulcanisation, moulded and vulcanised tyre.

Preferably said control unit comprises a unit for controlling an automatic visual control operating on the moulded and vulcanised tyre.

Preferably said system for detecting said parameter comprises an automatic visual control operating on the moulded and vulcanised tyre.

Preferably said succession of values comprises at least one first value and at least one second value respectively associated with different moulded and vulcanised tyres.

Still more preferably said first value and said second value are detected at two different moments.

Preferably comparing said succession of values and controlling the trend of said succession of values is carried out by a unit for controlling said automatic visual control.

Preferably said succession of values is compared with at least one reserve threshold, belonging to the acceptable interval of said parameter and defining one or more intervals acceptable with reserve proximal to the discard threshold.

Preferably said one or more intervals acceptable with reserve are distinct from said one or more warning intervals.

Preferably said reserve threshold divides said one or more intervals acceptable with reserve from said one or more warning intervals.

Preferably at least one of said one or more intervals acceptable with reserve is partially superimposed on at least one of said one or more warning intervals.

Preferably said control unit is programmed for controlling the trend of said succession of values
  by calculating the difference between each of the values and the discard threshold;
  by comparing an absolute value of a first difference relative to a first value with an absolute value of a second difference relative to a second value which precedes said first value in said succession.

Preferably said control unit is programmed for controlling the trend of said succession of values by calculating the first derivative of the function representative of the values of the parameter P.

Preferably said control unit is programmed for:
  comparing said succession of values of said parameter by comparing each value with at least one warning threshold, said at least one warning threshold belonging to the acceptable interval and defining one or more warning intervals, and for
  controlling the trend of said succession of values at least when a value of said succession of values is within the warning interval.

Preferably said control unit, programmed for feedbacking the result of the trend control, when said absolute value of said first difference is less than said absolute value of said second difference, modifies said parameter in a manner such that said absolute value of said first difference is greater than or equal to said absolute value of said second difference in the course of one or more further controls.

Preferably said control unit is programmed for feedbacking the result of the trend control by sending a feedback signal to one or more from among: the system for managing starting components;
  the system for managing the obtainment of semifinished products starting from one or more starting components;
  the system for managing the building of a green tyre starting from one or more semifinished products; and
  the system for managing the vulcanisation of the green tyre.

Preferably said control unit comprises a unit for controlling said system for managing the relative: starting component, step for obtaining semifinished products, semifinished product, step for building a green tyre, green tyre, vulcanisation, moulded and vulcanised tyre programmed for modifying said parameter as a function of the feedback signal.

BRIEF DESCRIPTION OF THE DRAWINGS

Further characteristics and advantages of the invention will be clearer from the following description of several embodiments of methods and plants according to the invention, given as a non-limiting example with reference to the enclosed figures in which:

FIG. 4a schematically illustrates a diagram reporting the detections of a parameter relative to the quality of a tyre being processed;

FIGS. 5 and 6 respectively illustrate possible variants of the diagram of FIG. 4a;

DETAILED DESCRIPTION OF THE INVENTION

Figure 1:
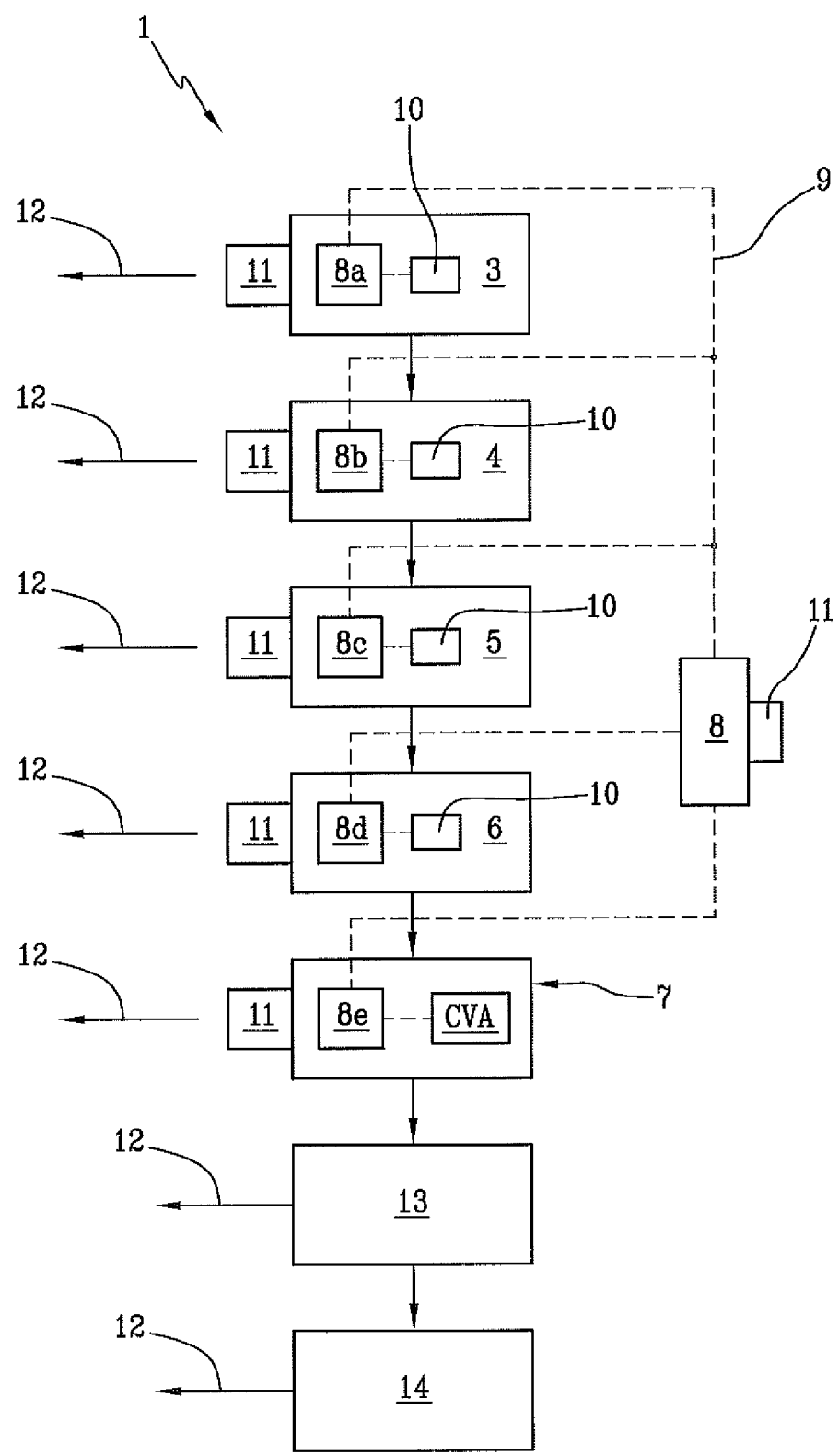
FIG. 1 schematically illustrates a possible embodiment of a plant for producing tyres according to the present invention.

With reference to FIG. 1, reference number 1 overall indicates a plant for producing tyres in which a system 2 operates for controlling a parameter P (FIG. 3) relative to the quality of a tyre being processed according to the present invention. In general, the system 2 for controlling a parameter relative to the quality of a tyre being processed operates by means of a method in which the parameter P is associated with one or more from among: starting components, steps for obtaining semifinished products, semifinished products, steps for building a green tyre, green tyres, vulcanisation, moulded and vulcanised tyres.

In particular the parameter P corresponds to a characteristic which, as a function of its value, can correspond to a flaw of the tyre.

The plant 1 comprises for example:
a system for managing starting components 3;
a system for managing the obtainment of semifinished products 4 starting from one or more starting components;
a system for managing the building of a green tyre 5 starting from one or more semifinished products;
a system for managing the vulcanisation 6 of the green tyre.

Each management system 3-6 can comprise and manage one or more stations, for example for obtaining semifinished products or for building the green tyre.

In accordance with a possible embodiment, the plant 1 comprises at least one control system 7 comprising an automatic visual control CVA operating on the moulded and vulcanised tyre.

According to the embodiment illustrated in FIG. 1, the plant 1 also comprises a control unit 8, for example arranged for managing the plant itself. Possibly, the control unit 8 is assisted by and operatively connected to one or more units 8a-8d for controlling the above-described management systems 3-6. Possibly, the control unit 8 is assisted by and operatively connected to a unit 8e for controlling the control system 7. In this case, the control unit 8 comprises the logical set of one or more of the respective units 8a-8e for controlling the above-described management systems 3-6 possibly also comprising the control system 7.

Figure 2:
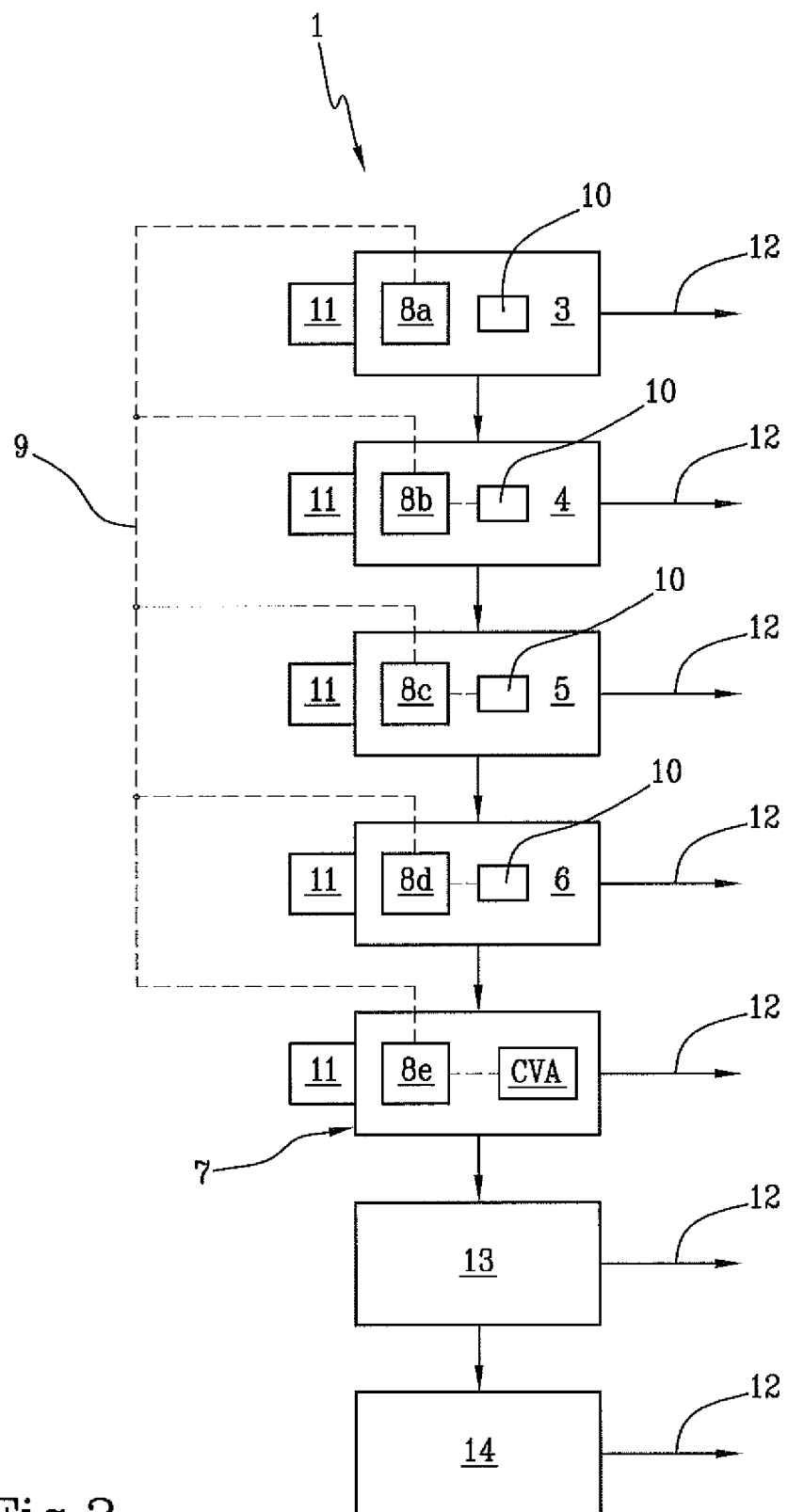
FIG. 2 schematically illustrates a further possible embodiment of a plant for producing tyres.

As an alternative, as illustrated in FIG. 2, a control unit is provided corresponding to the logical set of one or more units 8a-8d for controlling the above-described management systems 3-6 and/or unit 8e for controlling the control system 7.

In general, in the absence of one or more of the above-described control units, the control unit is defined by the logical set of the remaining units. In particular provision can be made such that the unit 8e for controlling the system 7 of automatic visual control CVA defines the unit for controlling the entire plant 1.

According to one possible embodiment, the plant comprises a communication network 9 interconnected between one or more of the management systems 3-6 (in particular the respective control units 8a-8d) and/or unit for controlling 8 the plant and/or the unit for controlling 8e the control system 7.

Advantageously the plant 1 comprises at least one system for detecting a parameter P relative to one or more tyres being processed PN1, PN2, . . . PNn.

In particular the detection system can comprise the automatic visual control CVA operating on the moulded and vulcanised tyre. In this case the parameter P can be any factor, element and/or characteristic associated with the moulded and vulcanised tyre and/or with a step for obtaining or building starting from the starting components.

In accordance with a possible embodiment, the detection system can comprise, in addition to or in substitution of the automatic visual control CVA, at least one detection system 10 associated with at least one of the systems 3-6 for managing the relative: starting component, semifinished product, green tyre, moulded and vulcanised tyre. In the case of system for managing starting components 3, the detection system 10 is a system for detecting a parameter P associated with the starting components, for example the expiry date. In the case of the system for managing the obtainment of semifinished products 4 starting from one or more starting components, the detection system 10 is a system for detecting a parameter P associated with the semifinished products and/or with a step for obtaining the semifinished product, for example the width of the tread band or the width and the corners of the belt layers. In the case of the system for managing the building of a green tyre 5 starting from one or more semifinished products, the detection system 10 is a system for detecting a parameter P associated with the green tyre and/or with a step for obtaining the green tyre, for example the length of the tread band or of the belt layers. In the case of the system for managing the vulcanisation 6 of the green tyre, the detection system 10 is a system for detecting a parameter P associated with the moulded and vulcanised tyre, and/or with a step for moulding and vulcanisation, for example the temperature of the so-called hot tables against which the sidewall plates of the mould and the sectors of the mould are abutted.

Figure 4:
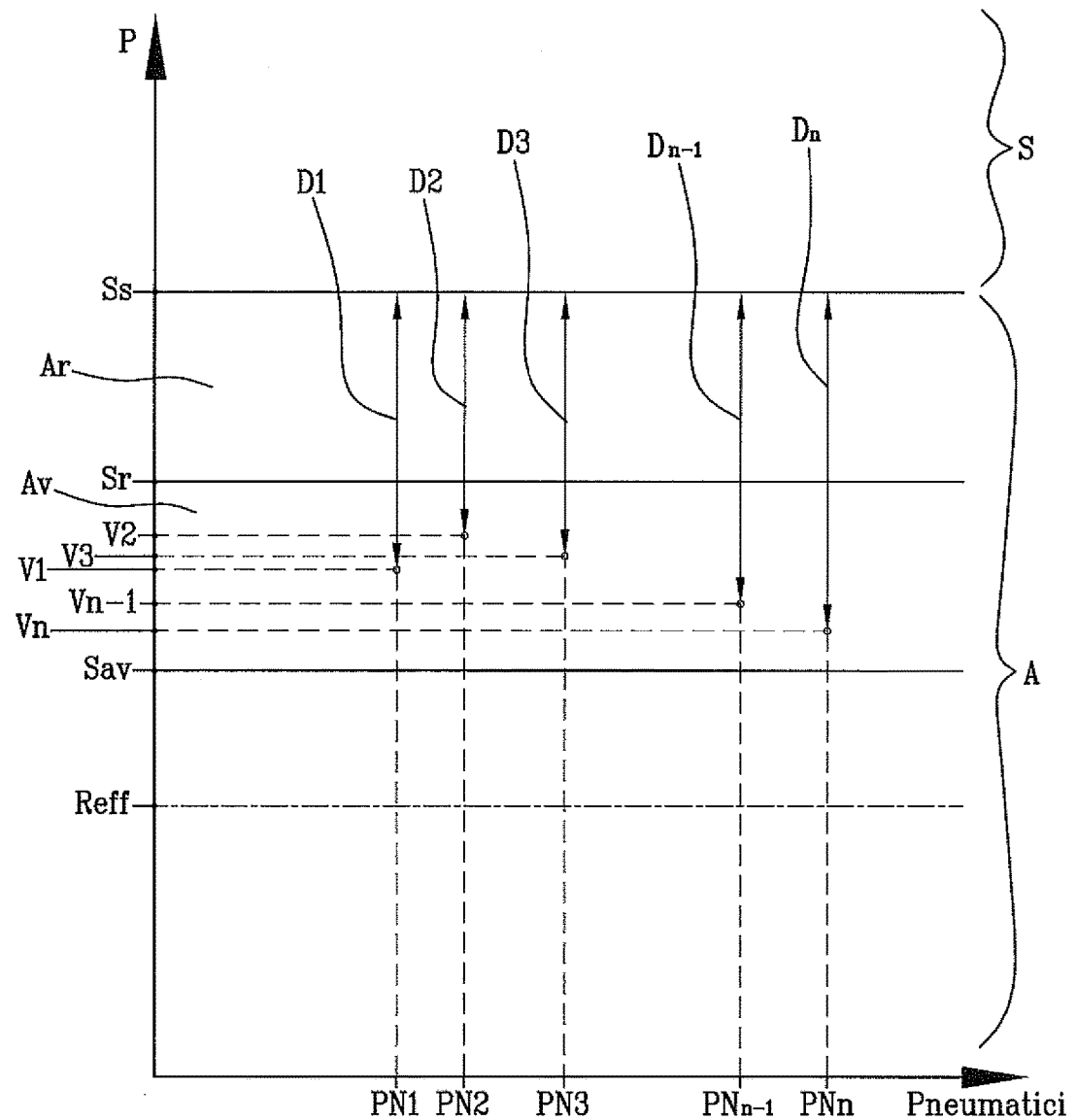
FIG. 4 schematically illustrates the diagram of FIG. 4a according to a possible application example.

The system for detecting a parameter P has its actual resolution Reff for example indicated in FIG. 4a and FIG. 4.

In addition to or as an alternative to the plant 1 can comprise interface devices 11, for example respectively provided at the above-described management systems 3-6 (in particular at respective units 8a-8d for controlling each management system) and/or at the unit 8 for controlling the plant and/or at the unit 8e for controlling the system 7 of automatic visual control CVA.

The plant 1 can also comprise one or more discard lines 12 selected from among:
a discard line for discarding a starting component;
a discard line for discarding a semifinished product;
a discard line for discarding a built green tyre;
a discard line for discarding a moulded and vulcanised tyre.

Possibly the plant can provide for one or more from among:
at least one instrument control system 13;
a manual visual control system 14.

One or more of such systems is preferably arranged downstream of the automatic visual control CVA, if present. One or more of such systems is operating on the moulded and vulcanised tyre. Corresponding discard lines 12 can be provided for the instrument control system 13 and/or for the manual visual control system 14.

The system 2 for controlling a parameter P relative to the quality of a tyre being processed according to the present invention comprises the above-indicated system for detecting a parameter P relative to one or more tyres being processed, which can be one or more from among the automatic visual control CVA and the detection systems 10 respectively associated with one of the management systems 3-6.

The system 2 for controlling a parameter P relative to the quality of a tyre being processed also comprises at least control unit programmed for:
comparing a succession of values V1, V2, . . . Vn of the parameter P by comparing each value with at least one discard threshold Ss and preferably with at least one warning threshold Sav, wherein the discard threshold Ss divides a discard interval S from an acceptable interval A and wherein the warning threshold Sav belongs to the acceptable interval A and defines one or more warning intervals Av;

controlling the trend of the succession of values V1, V2, . . . Vn, with respect to the discard threshold Ss and possibly with respect to the warning threshold Sav and/or to the actual resolution Reff of the detection system.

Preferably the control unit is programmed for controlling the trend of the succession of values at least when a value of the succession of values is within the warning interval Av (FIG. 4).

In other words the system 2 is configured for implementing a method for controlling the quality of a production of tyres in accordance with the present invention and comprising:

detecting the parameter P relative to one or more tyres being processed PN1, PN2, . . . PNn by means of at least one of the above-described detection systems;

comparing the succession of values V1, V2, . . . Vn of the parameter P by comparing each value at least with the discard threshold Ss and preferably at least with the warning threshold Sav;

controlling the trend of the succession of values V1, V2, . . . Vn with respect to the discard threshold Ss and possibly with respect to the warning threshold Sav and/or to the actual resolution Reff of the detection system, preferably at least when a value of the succession of values is within the warning interval Av.

If the system for detecting the parameter P comprises one or more of the detection systems 10 associated with one of the management systems 3-6 (hence relative to one or more from among: starting component, step for building semifinished products, semifinished product, step for building a green tyre, green tyre, vulcanisation, moulded and vulcanised tyre) the detection of the parameter P is preferably carried out at the corresponding management system.

The control with respect to the discard threshold Ss and possibly to the warning threshold Sav (or to the actual resolution Reff) is executed by verifying if the succession of values V1, V2, . . . Vn tends towards the discard threshold Ss or towards the warning threshold Sav (or to the actual resolution Reff).

In particular, controlling the trend of the succession of values can comprise calculating the difference D1, D2, . . . Dn between each of the values V1, V2, . . . Vn and the discard threshold Ss and comparing the absolute value of a first difference Dn relative to a first value Vn with the absolute value of a second difference Dn–1 relative to a second value Vn–1 which precedes the first value Vn in the succession, as will be also be explained hereinbelow with reference to FIG. 4.

Possibly, controlling the trend of the succession of values can comprise calculating the first derivative of the function representative of the succession of the values V1, V2, . . . Vn of the parameter P, in particular in the case of a continuous reading of the values of the parameter P, or evaluating the slope of the line joining two values of the parameter P.

The unit for controlling the system 2 is consistently programmed as a function of trend control modes, for example described above.

If the system for detecting a parameter P relative to one or more tyres being processed comprises the automatic visual control CVA, operating on the moulded and vulcanised tyre, the aforesaid control unit can comprise the unit 8e for controlling the control system 7.

If the system for detecting a parameter relative to one or more tyres being processed comprises one or more of the detection systems 10 associated with a management system 3-6, the aforesaid control unit can comprise a unit 8a-8d for controlling the management system 3-6.

In general, the unit for controlling the system 2 can be the unit 8 for controlling the plant 1 itself, or the logical set described above.

In general, the comparison of the succession of values and the trend control of the succession of values is carried out by a control unit. Preferably the comparison of the succession of values and the trend control of the succession of values is carried out by the unit for controlling 8e the automatic visual control CVA. Alternatively, the comparison of the succession of values and/or the trend control of the succession of values can be carried out by one or more of the above-described control units, preferably comprising a unit for controlling 8a-8d the relative management system 3-6.

The method according to the present invention provides for feedbacking the result of the trend control at least when the succession of values V1, V2, . . . Vn tends towards discard threshold Ss. The object of the feedbacking is to modify the parameter P in a manner so as to reverse, in the course of one or more further controls, the trend of the succession of values, for example directing it towards the warning threshold Sav (or the actual resolution Reff of the detection system) or by maintaining it constant.

In particular, the present invention provides for feedbacking the result of the trend control at least when, in absolute terms, the first difference Dn is less than the second difference Dn–1. In this case the object of the feedbacking is to modify the parameter P in a manner such that the first difference Dn results, in absolute terms, greater than or equal to the second difference Dn–1.

Alternatively, the feedbacking is carried out when the trend control, intended as the calculation of the first derivative of the function representative of the values of the parameter P and analysis of its sign, gives rise to positive values if the discard threshold Ss is greater than the detected values, or negative values, if the discard threshold Ss is less than the detected values. In this case the object of the feedbacking is to modify the parameter P in a manner such that the first derivative of the function representative of the values of the parameter P is zero or negative, if the discard threshold Ss is greater than the detected values, or zero or positive, if the discard threshold Ss is greater than the detected values.

The unit for controlling the system 2 can be consistently programmed for obtaining such feedbacking.

In general, the parameter P can be associated with one or more from among: starting components, steps for obtaining semifinished products, semifinished products, steps for building a green tyre, green tyres, vulcanisation, moulded and vulcanised tyres. In this case feedbacking the result of the trend control comprises sending feedback signal R to one or more from among the involved management systems, in particular to one or more from among:

the system for managing the starting components 3;

the system for managing the obtainment of semifinished products 4 starting from one or more starting components;

the system for managing the building of a green tyre 5 starting from one or more semifinished products; and the system for managing the vulcanisation 6 of the green tyre.

In particular the unit for controlling the system 2 is programmed for sending the feedback signal R.

The feedback signal R is adapted to affect the respective management system 3-6 in order to modify the parameter P in a manner so as to reverse the trend of the succession of values in the course of one or more further controls. In particular the feedback signal R is adapted to affect the respective management system 3-6 in order to modify the parameter P in a manner such that the succession of values remains constant or tends towards the actual resolution Reff, i.e. in a manner such that the succession of values of the parameter P does not tend further towards the discard threshold Ss.

In particular the feedback signal R is adapted to affect the respective management system 3-6 in order to modify the parameter P in a manner such that, in absolute terms, the first difference Dn is greater than or equal to the second difference Dn−1 in the course of one or more further controls. Possibly the feedback signal R is adapted to affect the respective management system 3-6 in order to modify the parameter P in a manner such that the trend intended as the first derivative of the function representative of the values of the parameter P is zero or negative, if the discard threshold Ss is greater than the detected values, or is zero or positive, if the discard threshold Ss is less than the detected values.

The feedback signal R is preferably sent to one of the units 8a-8d for controlling the management systems 3-6 and/or to the unit 8 for controlling the plant programmed for operating at the relative involved management system 3-6 and modifying the parameter P as a function of the feedback signal R.

In accordance with a possible embodiment, provision can be made such that the succession of values comprises at least one first value Vn and at least one second value Vn−1 associated with the same starting component, step for building semifinished products, semifinished product, step for building a green tyre, green tyre, vulcanisation, moulded and vulcanised tyre.

Alternatively, the succession of values comprises at least one first value Vn and at least one second value Vn−1 respectively associated with different starting components, steps for obtaining semifinished products, semifinished products, steps for building a green tyre, green tyres, vulcanisations, moulded and vulcanised tyres.

In accordance with a possible embodiment, the first value Vn and the second value Vn−1 can be detected at two different moments.

With reference to detection of the parameter P, the succession of values can be compared with at least one reserve threshold Sr, belonging to the acceptable interval A of the parameter P and defining one or more intervals acceptable with reserve Ar proximal to the discard threshold Ss. In particular, with reference to FIG. 4, the reserve threshold Sr and the discard threshold Ss delimit the acceptable interval with reserve Ar.

According to one embodiment, corresponding to the embodiment illustrated in FIG. 4, one or more intervals acceptable with reserve Ar are distinct from the one or more warning intervals Av. Preferably the reserve threshold Sr divides the one or more intervals acceptable with reserve Ar from the one or more warning intervals Av.

In an alternative embodiment, not illustrated, at least one of the intervals acceptable with reserve is partially superimposed on at least one of the warning intervals.

With reference to FIG. 4a, an example of a schematic graph is illustrated corresponding to the detection of the parameter P comprising a discard threshold Ss, a reserve threshold Sr and a warning threshold Sav. A discard interval S is then present, separated by means of the discard threshold Ss from an acceptable interval A. Provided within the aforesaid acceptable interval A are an acceptable interval with reserve Ar delimited by said discard threshold Ss and by said reserve threshold Sr and a warning interval Av (whose values are entirely acceptable) delimited by said reserve threshold Sr and by said warning threshold Sav. The left limit of FIG. 4a is not indicative in the evaluation of the relative parameter.

The parameter P increases from left to right in the example of FIG. 4a. The actual resolution Reff of the system for detecting the parameter P is less than the discard threshold Ss and less than the warning threshold Say. According to an alternative embodiment, not illustrated, the actual resolution Reff of the system for detecting the parameter P can be equivalent to the warning threshold Sav.

A detection of the parameter P corresponding to FIG. 4a is applied for example in the case of the starting components, for which the detected parameter can be the date of use. Alternatively the detection of the parameter P corresponding to FIG. 4a is applied for example in the case of the presence of air bubbles in one or more semifinished products, or in a corresponding obtainment step or in the green tyre or in a corresponding building step, or in the moulded and vulcanised tyre. A parameter P corresponding to the presence of air bubbles is for example given by their concentration and/or by their size.

In particular, with reference to the readings carried out by the automatic visual control CVA, the parameter P illustrated in FIG. 4a can be a cracking detected in the inner surface of the moulded and vulcanised tyre. Such cracking derives from the cracking of the vulcanisation chamber. The vulcanisation chamber is used during the process of moulding/vulcanisation of the green tyre and is obtained with rubber compounds in order to be inflated with gas and adhere to the green tyre in the inner part, pushing it towards the metal mould. The vulcanisation chamber sustains an aging during use and is substituted after a certain number of cycles. During use, the vulcanisation chamber can sustain an excessive aging with respect to the provided and have, for example, cracks that may even be considerable. Such cracks are moulded on the tyre and are considered a flaw if they exceed a certain size. Hence the discard threshold Ss corresponds to an upper limit of the acceptable interval A, in particular of the acceptable interval with reserve Ar.

With reference to FIG. 4, a schematic graph is illustrated corresponding to the detection of the succession of values V1, V2, . . . Vn of the parameter P. The scheme is analogous to that of FIG. 4a (illustrated horizontally), in which on the x-axis a factor for reading the parameter P is reported, for example time, a succession of tyres or other factors. In the reported example, there is a succession of tyres PN1, PN2, . . . PNn. On the y-axis, the parameter P and in particular the magnitudes relative to the values V1, V2, . . . Vn of the parameter P are reported. In the example illustrated, the increase of the value of P leads to increasing flaws so that the discard threshold Ss defines an upper limit of the acceptable interval A and in particular of the acceptable interval with reserve Ar.

With reference to FIG. 4, the case of a "slight" cracking is described in which the values V1, V2, . . . Vn of the parameter P corresponding respectively to tyres PN1, PN2, . . . PNn fall within the warning interval Av. In this case the system for detecting the parameter P comprises the automatic visual control CVA and the system 2 monitors the trend of two or more values V1, V2, . . . Vn in multiple tyres PN1, PN2, . . . , PNn moulded and vulcanised different from each other in order to verify if there is an approaching of the aforesaid values towards the discard threshold Ss (and before this towards the reserve threshold Sr).

The succession of values comprises at least one first value Vn and at least one second value Vn−1 respectively associated with different moulded and vulcanised tyres PNn, PNn−1. Also in this case the first value Vn and the second value Vn−1 can be detected at two different moments.

Illustrated in FIG. 4 are the differences D1, D2, . . . Dn between each of the values V1, V2, . . . Vn and the discard threshold Ss. Considering the succession formed by the values V1 and V2, the absolute value of the difference D2 is less than the absolute value of the difference D1. In other words, between V1 and V2, the succession tends towards the discard threshold Ss, i.e. the cracking is increasing.

Since the parameter P is associated with the vulcanisation and with the moulded and vulcanised tyre, a feedbacking can be carried out by sending feedback signal R (FIG. 3) to the system for managing the vulcanisation 6 of the green tyre which can monitor the state of the chamber and decide to substitute it ahead of time, eliminating the risk of having a flaw caused by serious cracking.

The feedbacking has the object of modifying the parameter P in a manner so as to reverse the trend of the succession of values in the course of one or more further controls, as in fact occurs for the values V3 and subsequent values. According to this embodiment, the feedback signal R is adapted to affect the system for managing the vulcanisation 6 in order to modify the parameter P in a manner such that the succession of the values remains constant or tends towards the actual resolution Reff, in particular in a manner such that the absolute value of the first difference Dn is greater than or equal to the absolute value of the second difference Dn−1 in the course of one or more further controls (see the final values indicated in FIG. 4).

The trend control of the succession of values of FIG. 4 can be carried out also by considering the first derivative of the function that interpolates the values in a specific interval and feedbacking the result of the control when the first derivative is positive, since the discard threshold Ss is greater than the detected values V1, V2, . . . Vn, (the discard threshold Ss defines the upper limit of the acceptable interval A). In this case, the object of the feedbacking is to modify the parameter P in a manner such that the succession of the values remains constant or tends towards the warning threshold Sav, in particular in a manner such that the first derivative of the function that interpolates the values in a specific interval is negative or zero.

In another application example with reference to the readings carried out by the automatic visual control CVA, the parameter P can be the so-called lack of material on the tread. This indicates the lack of material on the surface of the tread, e.g. due to irregular sliding of the compounds or to a local non-conformity on the tread band, and other similar problems. If the block has a rounded edge and poor linearity the tyre must be discarded. A slight deficiency and the presence of first teeth on the edges of the blocks correspond to an acceptable interval with reserve and hence are to be reviewed with possible more in-depth investigation. In the cases of slighter deficiencies, this falls within the warning interval with verification of the trend of the succession of the values of the parameter in order to possibly carry out feedbacking. In this case, the feedbacking, in particular the sending of the feedback signal R, is made with respect to the management systems that may have affected the parameter P (to the point of transforming it into a flaw), for example to the system for managing the obtainment of the semifinished products 4 and/or to the system for managing the starting components 3 (compounds), in the case of lack of material on the tread.

Figure 3:
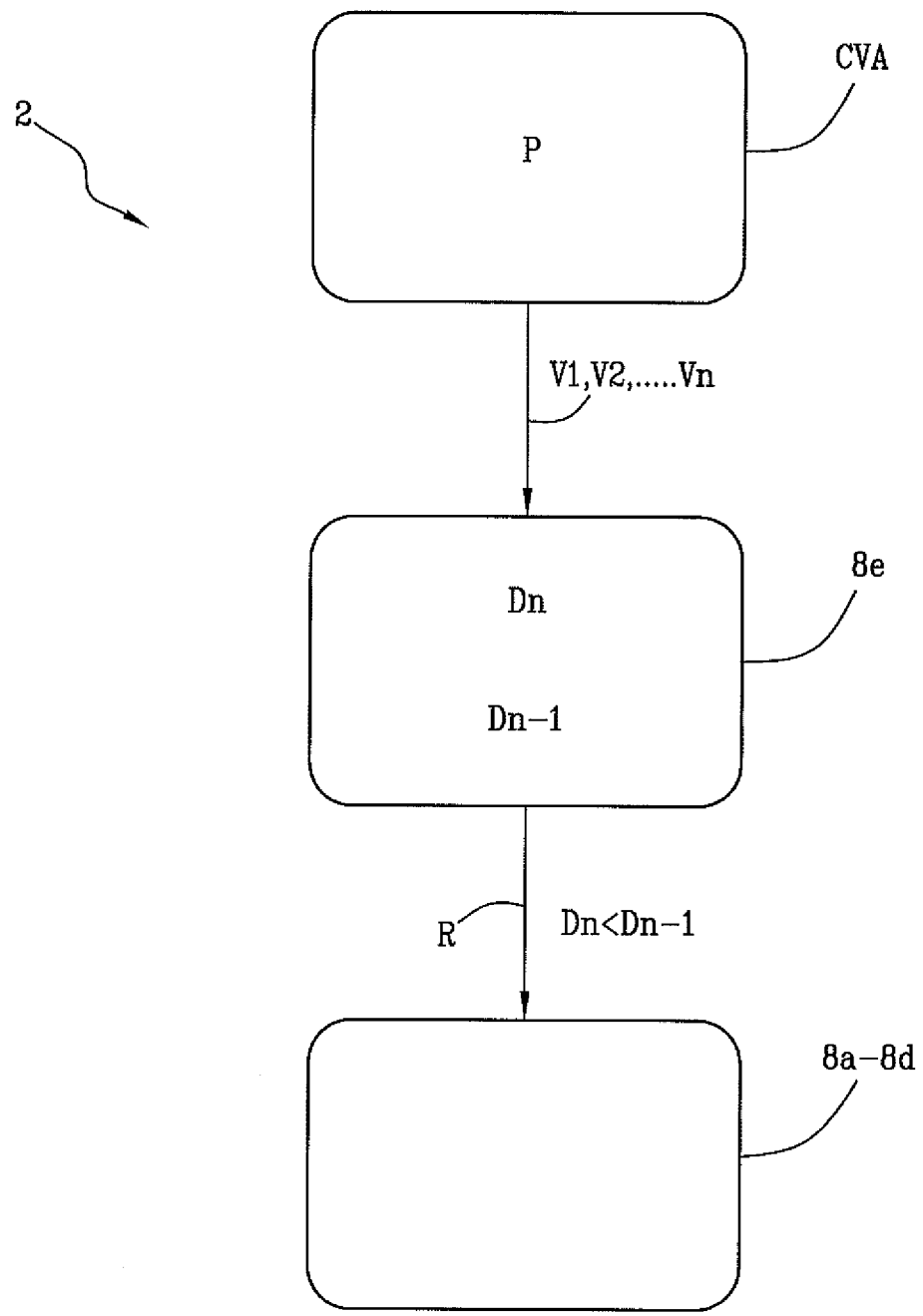
FIG. 3 illustrates a scheme of a system for controlling a parameter relative to the quality of a tyre being processed.

FIG. 3 illustrates a scheme of the system 2 for controlling a parameter P relative to the quality of a tyre being processed, with reference to the automatic visual control CVA as detection system. The same scheme is adaptable in the other above-described cases, i.e. in the cases in which in place of (or in addition to) the automatic visual control CVA, one or more of the detection systems 10 is provided associated with a management system 3-6.

At the level of the automatic visual control CVA, the parameter P relative to the quality of the finished product is detected, for example a parameter relative to the presence and size of specific flaws, such as the sign of a cracking on the inner surface of the moulded and vulcanised tyre (as described above). Different values V1, V2, . . . Vn of the parameter P are detected and sent to the unit 8e for controlling the automatic visual control CVA. The control unit 8e compares each value of the parameter P with at least the discard threshold Ss and preferably at least the warning threshold Sav. The trend of the succession of values with respect to the discard threshold Ss and preferably to the warning threshold Sav (or to the actual resolution Reff) is controlled, in particular at least when a value of the succession of values is within the warning interval Av.

FIG. 3 illustrates the case in which the control unit 8e calculates the difference D1, D2, . . . Dn between each of the values V1, V2, . . . Vn and the discard threshold Ss and compares the absolute value of the first difference Dn relative to the first value Vn with the absolute value of the second difference Dn−1 relative to the second value Vn−1 which precedes the first value Vn in the succession.

In the case of FIG. 3, corresponding to the embodiment described above with reference to FIG. 4, provision is made for feedbacking, e.g. by means of the feedback signal R, the result of the trend control when the absolute value of the first difference Dn is less than the absolute value of the second difference Dn−1: in such a manner, the subsequent values of the parameter P will be such that the absolute value of the first difference Dn is greater than or equal to the absolute value of the second difference Dn−1 in the course of one or more further controls. The feedback signal R is sent by the unit for controlling 8e the automatic visual control CVA to the relative control unit(s) 8a-8d of the affected management system(s).

Figure 5:
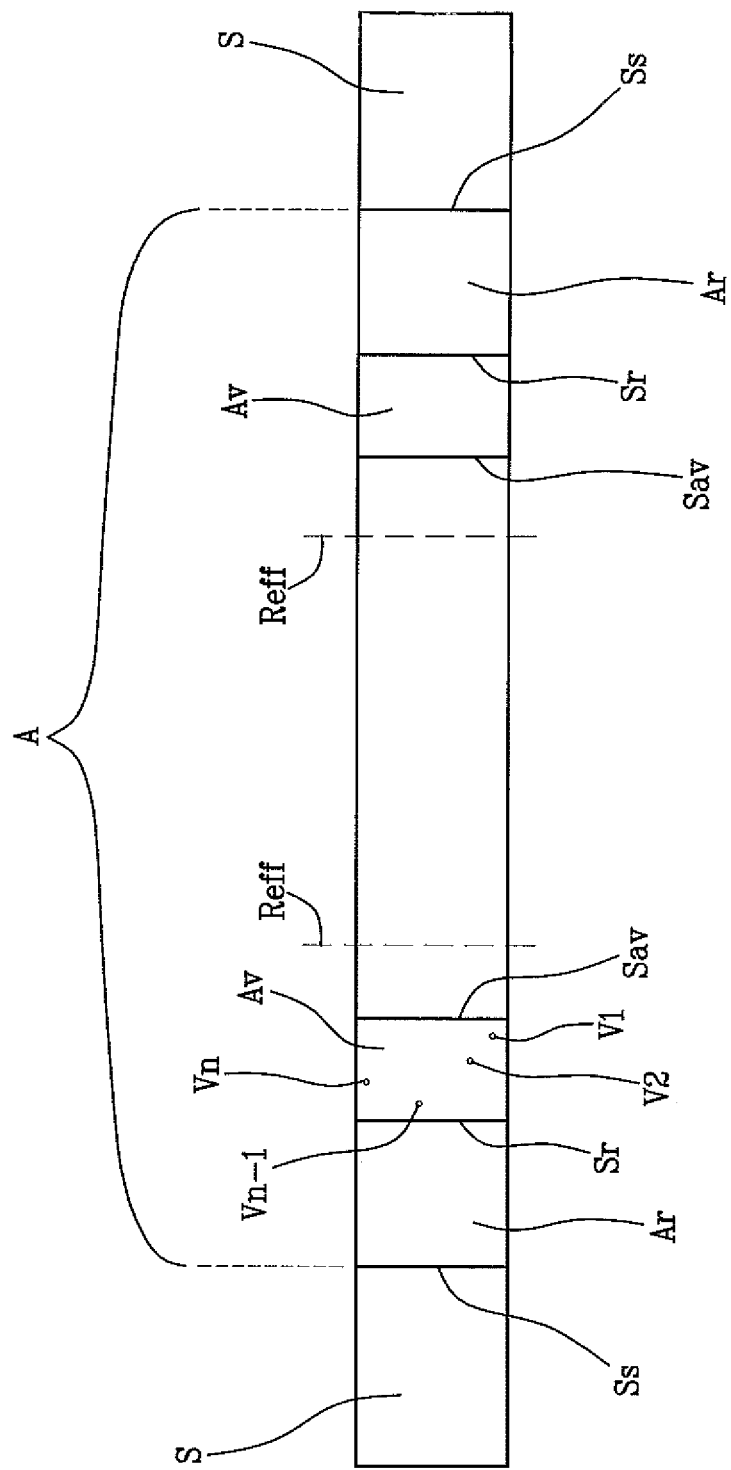

Further schematization of the detection of the parameter P can be provided, for example illustrated in FIGS. 5 and 6.

FIG. 5 corresponds to a duplication of the detection schematized in FIG. 4a. In this case, an acceptable interval A and two discard intervals S (e.g. an upper discard interval and a lower discard interval) are provided. Within the acceptable interval A, two warning intervals Av and two intervals acceptable with reserve Ar are provided. The acceptable interval A is arranged centrally with respect to a lower discard threshold Ss and to an upper discard threshold Ss.

Such schematization is for example applied in the case of the reading of the width of the tread band along the semifinished product itself, intending the parameter P of the width to be a numeric value calculated with reference to one of the two edges of the tread band itself.

With reference to one of the two edges of the tread band with V1, V2, . . . , Vn−1, Vn, several values of the width were indicated that fall within the warning interval Av. The detection of such values occurs at the system for managing the obtainment of semifinished products 4, in particular by means of the relative detection system 10.

The comparison of such values and the trend control of the succession preferably occurs at the unit 8b for controlling the system for managing the obtainment of semifinished products 4. From such comparison and control, it appears that the succession V1, V2, . . . Vn−1 tends towards the respective discard threshold Ss. The feedbacking can be operated by the control unit (e.g. by the unit 8b for controlling the system for managing the obtainment of semifinished products 4 starting from one or more starting components) for example by sending a feedback signal to the system for managing the starting components 3, e.g. to the compound room and/or to a raw material storage.

Due to the feedbacking, the control carried out at the value Vn detects that the succession V1, V2, . . . Vn−1 does not tend further towards the discard threshold Ss.

In turn, FIG. 6 corresponds to a duplication of the detection schematized in FIG. 5. In this case, two acceptable intervals A and three discard intervals S (e.g. an upper discard interval, an intermediate discard interval and a lower discard interval) are provided. Within each acceptable interval A, two warning intervals Av and two intervals acceptable with reserve Ar are provided. The detection of the parameter P illustrated in FIG. 6 is for example applied in the case of the reading of the width of the tread band along the semifinished product itself, intending the parameter of the width to be the distance of each of the two edges of the tread band itself with respect to a central reference. The application example can be analogous to that described above with reference to FIG. 5, in which the feedbacking has the object of maintaining the succession of values V1, V2, . . . Vn within the interval delimited by two adjacent warning thresholds Say.

Figure 7:
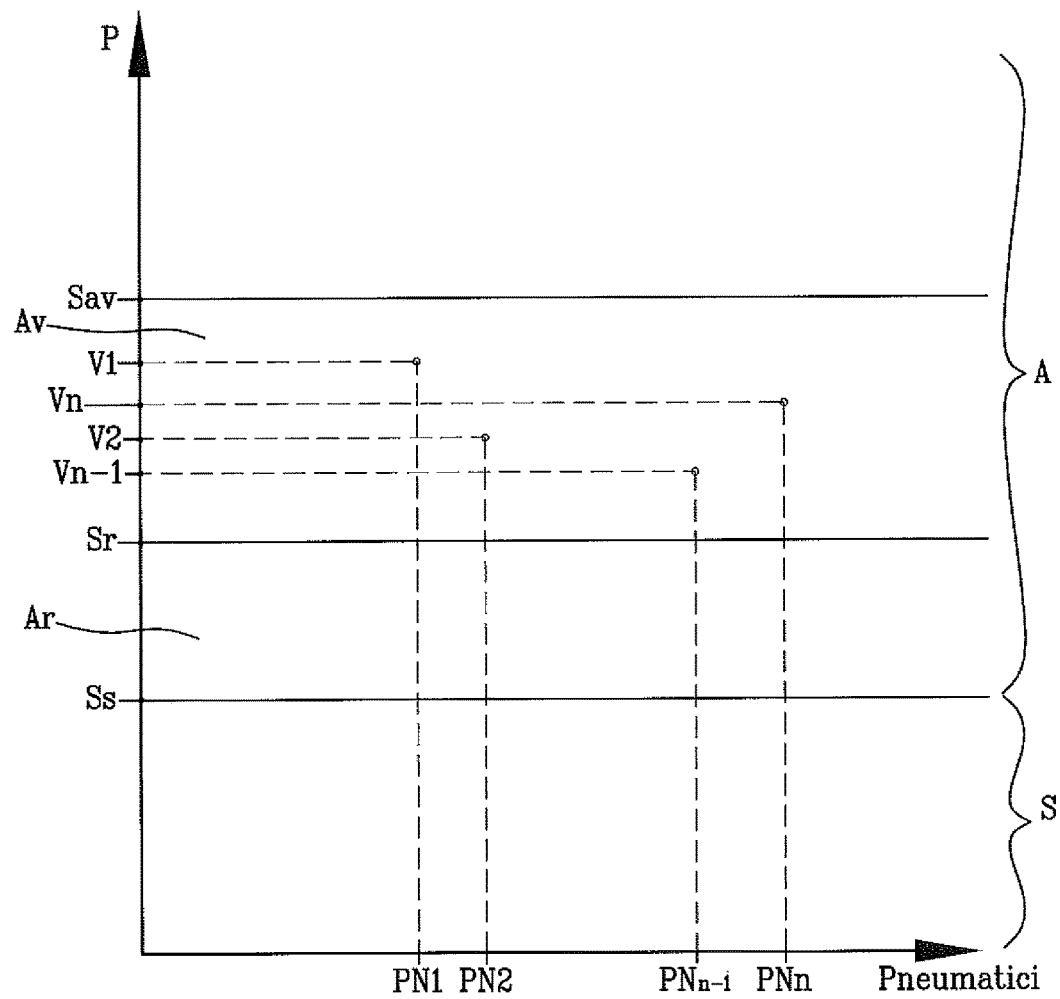
FIG. 7 schematically illustrates the diagram of FIG. 4a according to a further application example.

FIG. 7 illustrates a schematic graph corresponding to the detection of the succession of values V1, V2, . . . Vn of the parameter P analogous to that of FIG. 4 with the difference that the decrease of the value of P leads to increasing flaws so that the discard threshold Ss defines a lower limit of the acceptable interval A and of the acceptable interval with reserve Ar. An example of such parameter can be the width of the tread band.

The values V1, V2, . . . Vn of the parameter P corresponding respectively to tyres PN1, PN2, . . . PNn fall within the warning interval Av.

In this case the detection system monitors the trend of two or more values V1, V2, . . . Vn in multiple tyres PN1, PN2, . . . , PNn.

Since the discard threshold Ss is less than the detected values V1, V2, . . . Vn, (the discard threshold Ss defines the lower limit of the acceptable interval A) the trend control can be carried out considering the first derivative of the function which interpolates the values in a specific interval, feedbacking the result of the control when the first derivative is negative.

The feedbacking has the object of modifying the parameter P in a manner so as to reverse the trend of the succession of values in the course of one or more further controls, as in fact occurs for the values Vn−1 and subsequent values. In particular the feedback signal R is adapted to affect the relative management system for modifying the parameter P in a manner such that the succession of the values remains constant or tends towards the warning threshold Sav, and in particular, in a manner such that the first derivative of the function that interpolates the values in a specific interval is positive or zero.

The invention claimed is:

1. A method for controlling quality of production of tyres comprising:
   detecting a parameter relative to one or more tyres being processed by at least one detection system, wherein the parameter is chosen from starting components, steps for obtaining semifinished products, semifinished products, steps for building a green tyre, green tyres, vulcanisation, moulded and vulcanized tyres;
   comparing a succession of values of said parameter by comparing each value with at least one discard threshold wherein said at least one discard threshold divides a discard interval from an acceptable interval by at least one control unit;
   controlling a trend of said succession of values with respect to the discard threshold, wherein controlling the trend of said succession of values comprises:
      calculating a difference between each of the values and the discard threshold;
      comparing an absolute value of a first difference relative to a first value with an absolute value of a second difference relative to a second value which precedes said first value in said succession; and
   feedbacking a result of the trend control at least when said succession of values tends toward the discard threshold in order to operate on at least one system for managing a plant for producing tyres, in a manner so as to reverse the trend of the succession of values in the course of one or more further controls, wherein feedbacking the result of the trend control comprises sending a feedback signal to one or more chosen from: a system for managing starting components; a system for managing obtainment of semifinished products starting from one or more starting components; a system for managing building of a green tyre starting from one or more semifinished products; and a system for managing vulcanisation of the green tyre, of said plant for producing tyres,
   and wherein, when said absolute value of said first difference is less than said absolute value of said second difference, said feedback signal modifies said parameter in a manner such that said absolute value of said first difference is greater than or equal to said absolute value of said second difference in the course of one or more further controls.

2. The method for controlling quality of production of tyres as claimed in claim 1, wherein comparing said succession of values of said parameter comprises comparing each value with at least one warning threshold, wherein said at least one warning threshold belongs to an acceptable interval and defines one or more warning intervals.

3. The method for controlling quality of production of tyres as claimed in claim 2, comprising controlling the trend of said succession of values at least when a value of said succession of values is within a warning interval.

4. The method for controlling quality of production of tyres as claimed in claim 2, wherein the detection system has an actual resolution less than said discard threshold and less than or equal to said warning threshold.

5. The method for controlling quality of production of tyres as claimed in claim 1, wherein said succession of values comprises at least one first value and at least one second value associated with a same starting component, step for obtaining semifinished products, semifinished product, step for building a green tyre, green tyre, vulcanisation, moulded and vulcanised tyre.

6. The method for controlling quality of production of tyres as claimed in claim 5, wherein said first value and said second value are detected at two different moments.

7. The method for controlling quality of production of tyres as claimed in claim 1, wherein said succession of values comprises at least one first value and at least one second value respectively associated with different starting components, steps for obtaining semifinished products, semifinished products, steps for building a green tyre, green tyres, vulcanisations, moulded and vulcanised tyres.

8. The method for controlling quality of production of tyres as claimed in claim 1, wherein the detection system is associated with one of the systems for managing the relative: starting component, step for obtaining semifinished products, semifinished product, step for building a green tyre, green tyre, vulcanisation, moulded and vulcanised tyre, and wherein detecting said parameter is carried out at said system for managing.

9. The method for controlling quality of production of tyres as claimed in claim 8, wherein said control unit comprises a unit for controlling said system for managing the relative: starting component, step for obtaining semifinished products, semifinished product, step for building a green tyre, green tyre, vulcanisation, moulded and vulcanised tyre.

10. The method for controlling quality of production of tyres as claimed in claim 8, wherein said control unit comprises a unit for controlling an automatic visual control operating on the moulded and vulcanised tyre.

11. The method for controlling quality of production of tyres as claimed in claim 1, wherein the detection system comprises an automatic visual control operating on a moulded and vulcanised tyre.

12. The method for controlling quality of production of tyres as claimed in claim 11, wherein said succession of values comprises at least one first value and at least one second value respectively associated with different moulded and vulcanised tyres.

13. The method for controlling quality of production of tyres as claimed in claim 12, wherein said first value and said second value are detected at two different moments.

14. The method for controlling quality of production of tyres as claimed in claim 11, wherein comparing said succession of values and controlling the trend of said succession of values is carried out by a unit for controlling said automatic visual control.

15. The method for controlling quality of production of tyres as claimed in claim 1, wherein said succession of values is compared with at least one reserve threshold belonging to an acceptable interval of said parameter and defining one or more intervals acceptable with reserve proximal to the discard threshold.

16. The method for controlling quality of production of tyres as claimed in claim 15, wherein said one or more intervals acceptable with reserve are distinct from one or more warning intervals.

17. The method for controlling quality of production of tyres as claimed in claim 16, wherein said reserve threshold divides said one or more intervals acceptable with reserve from said one or more warning intervals.

18. The method for controlling quality of production of tyres as claimed in claim 15, wherein at least one of said one or more intervals acceptable with reserve is partially superimposed on at least one or more warning intervals.

19. A method for controlling quality of production of tyres comprising:
   detecting a parameter relative to one or more tyres being processed by at least one detection system, wherein the parameter is chosen from starting components, steps for obtaining semifinished products, semifinished products, steps for building a green tyre, green tyres, vulcanisation, moulded and vulcanized tyres;
   comparing a succession of values of said parameter by comparing each value with at least one discard threshold wherein said at least one discard threshold divides a discard interval from an acceptable interval by at least one control unit;
   controlling a trend of said succession of values with respect to the discard threshold, wherein controlling the trend of said succession of values comprises calculating a first derivative of a function representative of values of the parameter and analysing a sign of the first derivative; and
   feedbacking a result of the trend control at least when said succession of values tends toward the discard threshold in order to operate on at least one system for managing a plant for producing tyres, in a manner so as to reverse the trend of the succession of values in the course of one or more further controls, wherein feedbacking the result of the trend control comprises sending a feedback signal to one or more chosen from: a system for managing starting components; a system for managing obtainment of semifinished products starting from one or more starting components; a system for managing building of a green tyre starting from one or more semifinished products; and a system for managing vulcanisation of the green tyre, of said plant for producing tyres,
   and wherein, when the first derivative of the function representative of the values of the parameter is positive with the discard threshold greater than the detected values or when the first derivative of the function representative of the values of the parameter is negative with the discard threshold less than the detected values, said feedback signal is adapted to affect a respective system for managing in order to modify said parameter in a manner such that the first derivative of the function representative of the values of the parameter is zero or negative, if the discard threshold is greater than the detected values, or such that the first derivative of the function representative of the values of the parameter is zero or positive, if the discard threshold is less than the detected values.

20. The method for controlling quality of production of tyres as claimed in claim 19, wherein comparing said succession of values of said parameter comprises comparing each value with at least one warning threshold, wherein said at least one warning threshold belongs to an acceptable interval and defines one or more warning intervals.

21. The method for controlling quality of production of tyres as claimed in claim 19, wherein said succession of values comprises at least one first value and at least one second value associated with a same starting component, step for obtaining semifinished products, semifinished product, step for building a green tyre, green tyre, vulcanisation, moulded and vulcanised tyre.

22. The method for controlling quality of production of tyres as claimed in claim 19, wherein said succession of values comprises at least one first value and at least one second value respectively associated with different starting components, steps for obtaining semifinished products, semifinished products, steps for building a green tyre, green tyres, vulcanisations, moulded and vulcanised tyres.

23. The method for controlling quality of production of tyres as claimed in claim 19, wherein the detection system is associated with one of the systems for managing the relative: starting component, step for obtaining semifinished products, semifinished product, step for building a green tyre, green tyre, vulcanisation, moulded and vulcanised tyre, and wherein detecting said parameter is carried out at said system for managing.

24. The method for controlling quality of production of tyres as claimed in claim 19, wherein the detection system comprises an automatic visual control operating on a moulded and vulcanised tyre.

25. The method for controlling quality of production of tyres as claimed in claim 19, wherein said succession of values is compared with at least one reserve threshold belonging to an acceptable interval of said parameter and defining one or more intervals acceptable with reserve proximal to the discard threshold.

26. A plant for producing tyres comprising:
   a system for managing starting components;
   a system for managing obtainment of semifinished products starting from one or more starting components;
   a system for managing building of a green tyre starting from one or more semifinished products;
   a system for managing vulcanisation of said green tyre; and
   a system for controlling a parameter relative to quality of a tyre being processed comprising:
      at least detection system for detecting a parameter relative to one or more tyres being processed wherein said parameter is associated with one or more from among: starting components, steps for obtaining semifinished products, semifinished products, steps for building a green tyre, green tyres, vulcanisation, moulded and vulcanised tyres; and
      at least one control unit programmed for:
         comparing a succession of values of said parameter by comparing each value with at least one discard threshold, wherein said at least one discard threshold divides a discard interval from an acceptable interval;
         controlling a trend of said succession of values with respect to the discard threshold; and
         feedbacking a result of the trend control at least when said succession of values tends toward the discard threshold in order to operate on at least one of said systems for managing, in a manner so as to reverse the trend of the succession of values in a course of one or more further controls,
   and wherein said control unit is programmed for feedbacking a result of the trend control by sending a feedback signal to one or more from among: the system for managing starting components; the system for managing the obtainment of semifinished products starting from one or more starting components; the system for managing the building of a green tyre starting from one or more semifinished products; and the system for managing the vulcanisation of the green tyre.

27. The plant for producing tyres as claimed in claim 26, wherein said control unit is programmed for controlling the trend of said succession of values
   by calculating a difference between each of the values and the discard threshold; and
   by comparing an absolute value of a first difference relative to a first value with an absolute value of a second difference relative to a second value which precedes said first value in said succession.

28. The plant for producing tyres as claimed in claim 27, wherein said control unit programmed for feedbacking the result of the trend control, when said absolute value of said first difference is less than said absolute value of said second difference, modifies said parameter in a manner such that said absolute value of said first difference is greater than or equal to said absolute value of said second difference in a course of one or more further controls.

29. The plant for producing tyres as claimed in claim 26, wherein said control unit is programmed for controlling the trend of said succession of values by calculating a first derivative of a function representative of values of the parameter.

30. The plant for producing tyres as claimed in claim 26, wherein the detection system comprises an automatic visual control operating on a moulded and vulcanised tyre.

31. The plant for producing tyres as claimed in claim 30, wherein said control unit comprises a unit for controlling said automatic visual control.

32. The plant for producing tyres as claimed in claim 26, wherein the detection system is associated with at least one of the systems for managing a relative: starting component, step for obtaining semifinished products, semifinished product, step for building a green tyre, green tyre, vulcanisation, moulded and vulcanised tyre.

33. The plant for producing tyres as claimed in claim 32, wherein said control unit comprises a unit for controlling said system for managing the relative: starting component, step for obtaining semifinished products, semifinished product, step for building a green tyre, green tyre, vulcanisation, moulded and vulcanised tyre.

34. The plant for producing tyres as claimed in claim 26, wherein said control unit is programmed for:
   comparing said succession of values of said parameter by comparing each value with at least one warning threshold, said at least one warning threshold belonging to the acceptable interval and defining one or more warning intervals, and for
   controlling a trend of said succession of values at least when a value of said succession of values is within the warning interval.

35. The plant for producing tyres as claimed in claim 26, wherein said control unit comprises a unit for controlling said system for managing a relative: starting component, step for obtaining semifinished products, semifinished product, step for building a green tyre, green tyre, vulcanisation, moulded and vulcanised tyre, said unit for controlling programmed for modifying said parameter as a function of the feedback signal.

* * * * *